May 8, 1951
R. J. MOSER
2,551,690
DUAL CONTROL OF DIFFERENTIAL MECHANISM
FOR ACCOUNTING MACHINES.
Filed May 29, 1947
2 Sheets-Sheet 1
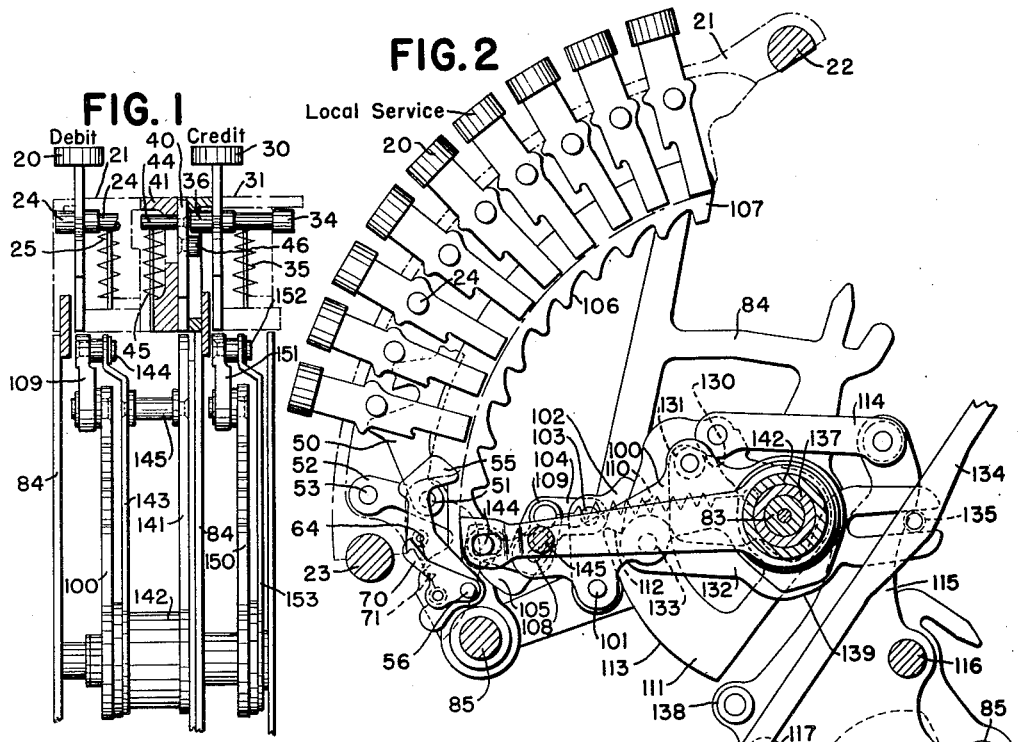
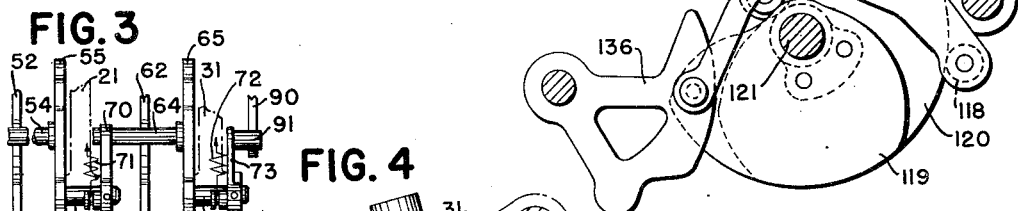
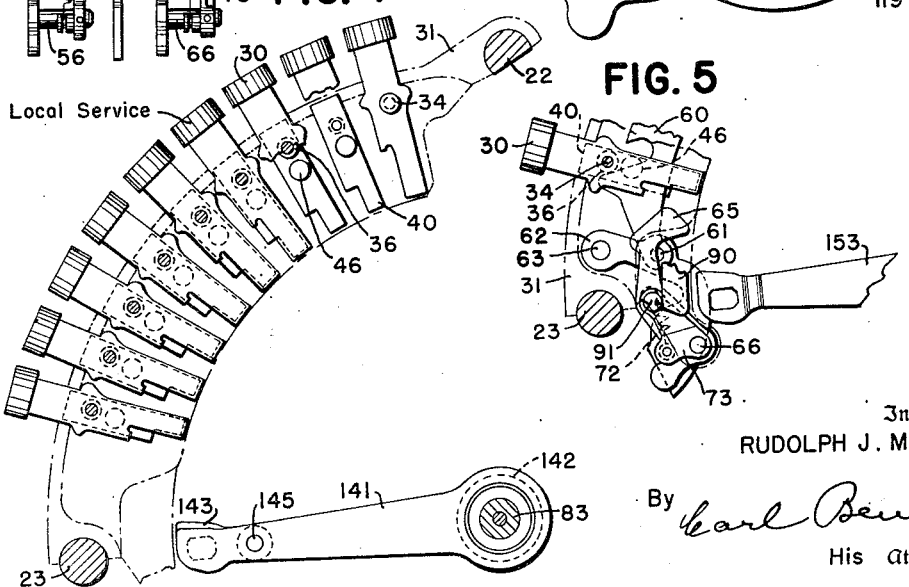
Inventor
RUDOLPH J. MOSER
By Carl Beust
His Attorney

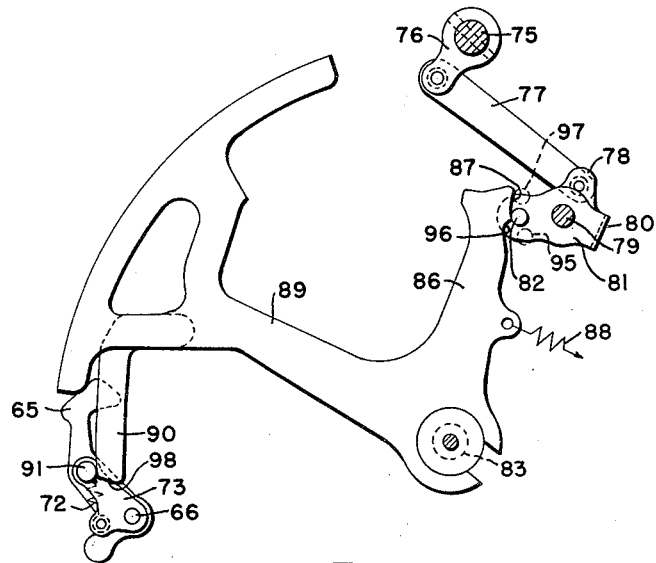

Patented May 8, 1951

2,551,690

UNITED STATES PATENT OFFICE 2,551,690

DUAL CONTROL OF DIFFERENTIAL MECHANISM FOR ACCOUNTING MACHINES

Rudolph J. Moser, Dayton, Ohio, assignor to The National Cash Register Company, Dayton, Ohio, a corporation of Maryland Application May 29, 1947, Serial No. 751,301

12 Claims. (Cl. 197—127)

This invention relates to cash registers and accounting machines of the general type disclosed in United States Letters Patent to Bernis M. Shipley, No. 1,619,796 and Mayo A. Goodbar, No. 2,305,000, issued March 1, 1927, and December 15, 1942, respectively, and is more particularly directed to a dual control of a differentially adjustable means by a plurality of banks of keys.

As one specific example, the novel key control is particularly adaptable and useful in a machine of the type shown in the above mentioned Goodbar patent and especially so when used in conjunction with or as a telephone billing machine where it is desirable to select certain lines of the telephone bill to be printed upon.

In such types of machines for preparing bills or statements to be sent to the customers, a bank of keys controls the positioning of a differential means or mechanism to cause said mechanism to operate a bill feeding means to select a certain line of the bill depending upon whichever one of the keys in the control bank is operated.

For example if, in a telephone billing machine, a key designated as "local service" is operated, such key through the differential means under control of the keys in that bank, selects a certain line on the bill to receive the amount charged for "local service," and such amount is set up on amount keys and is termed a charge or debit. Now if the same customer, instead of having a charge, is entitled to a credit it is necessary to select the same line on the telephone bill to receive the printing of such credited amount, and in order to avoid selecting the wrong line, a bank of credit keys for each of the several types of charges is arranged adjacent the charge or debit keys. In the bank of credit keys the "local service" credit key is opposite the "local service" debit key; the "long distance" credit key is opposite the "long distance" debit key and so on for each of the various charge and credit keys relating to like services or characteristics.

Associated with this bank of credit keys is a series or set of key stems without any manipulating heads thereon, each key stem being operated by its associated credit key. Each of these key stems cooperates with a differentially adjustable member rigidly secured to the differential means which is controlled by the keys of the debit bank and said key stems are adapted to be moved, by their associated credit keys, into the path of said member to control the differential adjustment of said member, and through said member determine the differential positioning of said differential means, thus selecting the same line on the bill that is selected by the debit key opposite the operated credit key by causing the bill feeding means to be controlled by the same differential means regularly controlled by said debit keys.

The bill feeding means referred to is not shown herein but is fully illustrated and described in the above mentioned Goodbar Patent No. 2,305,000. A part of the line selecting mechanism set by the differential means is shown herein and is substantially like that shown in said Goodbar patent.

Therefore, it is an object of the present invention to provide novel means to control a single differential means from a plurality of banks or sets of manually operable means.

Another object is to provide means to control a differentially adjustable means, which is regularly controlled by one set of manipulative devices, by another set of manipulative devices.

A further object is to provide a differentially adjustable means and a set of manipulative devices to control the positioning thereof, and to provide another set of manipulative devices arranged adjacent the first set of devices and having means interposed between the differentially adjustable means and the second set of manipulative devices and operable by said second set of devices to cause the differentially adjustable means to be set in the same position that it is set in by the manipulative device of the first set which is opposite the operated manipulative device of the second set.

With these and other incidental objects in view the invention includes certain novel features of construction and combinations of parts, the essential elements of which are set forth in the appended claims and a preferred form or embodiment of which is hereinafter described with reference to the drawings which accompany and form a part of this specification.

In the drawings:

Fig. 1 is an edge view, partly in section, showing the relationship between the banks of debit and credit keys which control a single differential mechanism.

Fig. 2 is a right side elevation of the debit keys and the associated differential mechanism.

Fig. 3 is an edge elevation of the zero stop means associated with the banks of debit and credit keys.

Fig. 4 is a right side elevation of the credit keys and the means operated and controlled thereby to control the differential mechanism associated with the debit keys.

Fig. 5 is a side elevation of a portion of a bank of credit keys showing the zero stop means for this bank of keys.

Fig. 6 is a right side elevation showing the mechanism for holding the zero stops normally out of active or operative positions and also showing the means for permitting them to become active immediately upon actuation of the machine release mechanism.

Fig. 7 shows in enlarged scale, a facsimile of a part of a customer's bill or statement printed by the machine with which the present invention is associated.

GENERAL DESCRIPTION

In view of the preliminary statements given above, it is not thought necessary to go into any lengthy general description of this invention. Suffice it to say that the present invention includes a plurality of banks of manipulative devices or keys, one bank being designated as a debit bank and the other as a credit bank. The debit bank of keys controls a differential mechanism which in turn controls mechanism for feeding a bill or statement to certain definite lines, each line position being controlled by a certain key of the debit bank.

For illustrative purposes, as above mentioned, a machine to be used in connection with the production of bills or statements for telephone customers has been chosen as a specific example.

Each of the keys of the credit bank is associated with and determines the line position to which the bill is to be fed whereby each credit item printed is always printed in the same line that a debit item of the same class or characteristic would be printed if the amount were to be charged or debited instead of credited. For example, all "local service" charges are printed in the fourth space or on the fourth line of the bill illustrated in Fig. 7 and all "local service" credits are printed in the same space when the machine is operated with the "local service" credit key depressed.

This is accomplished by interposing between the bank of debit keys and the bank of credit keys novel mechanism under control of the bank of credit keys to control the differential mechanism which is normally controlled by the bank of debit keys.

DETAILED DESCRIPTION

Key banks

In the present case there is illustrated two rows or banks of what is known in the art as transaction or control keys of the same general type as the control keys illustrated and described in the above mentioned Goodbar Patent No. 2,305,090.

For the purposes of the present case the left hand bank of keys in Fig. 1 will be referred to as the debit bank of keys and the right hand bank of keys will be referred to as the credit bank of keys.

There are illustrated nine debit keys 20 (Figs. 1 and 2), supported in the usual manner in a key frame 21, carried on crossrods 22 and 23, supported by the machine side frames (not shown) in the same manner as disclosed in the previously mentioned Shipley Patent No. 1,619,796. These keys 20 carry studs 24 which project from both sides thereof and cooperate with springs 25, which hold the keys normally in the outer or undepressed positions.

To the right of the bank of debit keys 20, there are nine credit keys 30 (Figs. 1, 4 and 5), supported in the usual manner in a key frame 31, carried on the crossrods 22 and 23. These keys 30 carry studs 34 which cooperate with springs 35 which hold the keys 30 normally in their outer or undepressed positions. Each of the keys 30 is also provided with a stud 36 in axial alignment with stud 34 and projecting from the opposite side of the key 30. The purpose of this stud 36 will be later described.

Interposed between the two banks of keys 20 and 30 is a series of key stems 40 (Figs. 1, 4 and 5), supported in a key frame 41 carried by the rods 22 and 23. Each of the key stems 40 has a stud 44 cooperating with a spring 45 which holds the key stems 40 normally in their inactive or undepressed positions as shown in Fig. 1. Each of the key stems 40 also has thereon a stud 46 immediately below and in the path of the stud 36 on the associated key 30 as is clearly shown in Figs. 1 and 4.

Associated with the debit keys 20 and adapted to be operated thereby is a bar 50 (only the lower portion of which is shown) pivoted at 51 to an arm 52 on a stud 53, carried by the frame 21. When one of the keys 20 is depressed its pin 24 moves the bar 50 downwardly and rocks the arm 52 clockwise into cooperation with a pin 54 (Fig. 3) on a zero stop 55, secured to a short shaft 56, supported by the key frame 21.

Associated with credit keys 30 is a bar 60 (only the lower end of which is shown in Fig. 5) which is pivoted at 61 to an arm 62, pivoted on a stud 63 carried by the frame 31. When any of the keys 30 is depressed the associated stud 36 moves the bar 60 downwardly and rocks the arm 62 into cooperation with a pin 64 (Figs. 2 and 3) carried by a zero stop 65 secured to a short shaft 66, supported in the key frame 31.

When one of the debit keys 20 is depressed to record a debit transaction the movement of the arm 52, by the depression of the key 20, as above stated, causes the arm 52 to contact the stud 54 in the zero stop 55 and hold this zero stop in its normal inactive position, shown in Fig. 2, so that the differential mechanism, to be hereinafter described, and associated with the bank of debit keys 20 can be set under the control of the depressed debit key 20.

Whenever one of the credit keys 30 is depressed, the rocking movement of the arm 62 by the depressed key 30 causes said arm to engage the pin 64 and hold the zero stop 65 for this bank of keys in its normal position whereby the differential means associated with this bank of keys can be set under the control of this bank of keys.

The keys 20 and 30 have captions representing the nine different characteristics or transactions printed opposite the nine spaces above the "Total" space shown on the customer's statement or bill 68 in Fig. 7.

Since, in the present invention, the differential mechanism associated with the debit keys is the one which controls the differential feeding of the customer's statement or bill 68 shown in Fig. 7, it is necessary to control the zero stop 55 and retain it in its normally ineffective position whenever one of the credit keys 30 is depressed so that the bill will be differentially positioned to the proper printing line which corresponds to the debit key 20 directly opposite the operated credit key 30.

Therefore, whenever the arm 62 is moved into contact with the pin 64 to hold the zero stop 65 in its normally ineffective position, this pin 64 which is normally in contact with an arm 70 (Figs. 2 and 3), held against the pin 64 by a spring 71 will retain the zero stop 55 in its normal ineffective position because the arm 70 is secured to the same shaft 56 to which the zero stop 55 is secured. Therefore, the differential mechanism associated with the debit key 20 will be controlled by the operated credit key 30 through its associated key stem 40 in a manner to be hereinafter described.

From the above it is clear that after the machine starts to operate with one of the credit keys 30 depressed, the zero stop 55 will be held in an inactive position through the mechanism just described.

When no key 30 is depressed the zero stop 65 associated with the credit keys 30 is moved from inactive into active position by a spring 72 (Figs. 3 and 5), connected to an arm 73 which is secured to the previously mentioned shaft 66 to which is fastened the zero stop 65.

Both zero stops 55 and 65 are normally held in their inactive positions, by means later described, until the machine is released and then if there is no key 30 depressed the spring 72 will rock the arm 73, shaft 66 and zero stop 65 in a clockwise direction (Fig. 5) to move this zero stop 65 into active position to stop the differential mechanism for this bank of credit keys in a zero position.

As above mentioned both zero stops 55 and 65 are held in their inactive positions shown, prior to the release of the machine by means and mechanism which will now be described, which means is operated upon release of the machine to free the zero stops 55 and 65 to the control of the keys 30.

Referring particularly to Fig. 6, there is illustrated, what is known in this art in connection with machines of the types shown in the above mentioned Shipley and Goodbar patents, a machine release shaft 75 having secured thereto an arm 76 to which is pivoted a link 77, also pivoted to an arm 78 pivoted on a rod 79. The arm 78 is connected by a yoke 80 to an arm 81 carrying a pin 82.

Pivoted on a hub 83 (Figs. 2 and 6) supported between plates 84 (only one of which is shown) which are carried by studs 85 is an arm 86 having a surface 87 held normally in contact with the pin 82 by a spring 88. Integral with the arm 86 is an arm 89 having a finger 90 normally contacted by a stud 91 on the previously described arm 73. A part of this finger 90 is shown in Fig. 5.

With the parts in the normal positions shown in Fig. 6 prior to the release of the machine it can be seen that the finger 90 by its engagement with the stud 91 holds the arm 73, the shaft 66 to which it is fastened and the zero stop 65 in the inactive position, out of relationship with or out of the path of movement of the differential mechanism associated with the bank of credit keys 30, and at the same time the pin 64 which is carried by the zero stop 65 through its contact with the arm 70 holds said arm, the shaft 56 to which it is secured and the zero stop 55 in a normal inactive position out of the path of movement of the differential mechanism associated with the bank of debit keys 20.

By means which is fully illustrated and described in the above mentioned Shipley Patent No. 1,619,796 and also in the Goodbar Patent No. 2,305,000, when the machine is released for operation upon the depression of a key or motor bar to release the motor clutch, the shaft 75 is immediately given a clockwise movement as viewed in Fig. 6. When this occurs, the arms 78 and 81 are moved counterclockwise moving the pin 82 from the position shown in Fig. 6 to the dot and dash position indicated at 95, whereupon the spring 88 immediately rocks the arm 86 clockwise until a surface 96 contacts the pin 82 in its moved position indicated at 95, thus rocking the arm 89 and lifting the finger 90 above the stud 91, whereupon the spring 72 rocks the zero stop 65 clockwise until its pin 64 contacts the arm 62 which allows the zero stop 65 to be moved into the path of the differential mechanism for the bank of credit keys 30 if none of the keys in that bank has been depressed.

The movement of this pin 64 moves it away from the arm 70 and releases the zero stop 55 to the control of the debit keys 20 but since a debit key 20 is depressed when a credit key 30 is not depressed, the depression of the debit key 20 has moved the bar 50 downwardly and causes a clockwise movement of the arm 52 and moved said arm into contact with the stud 54 on the zero stop 55 for the bank of debit keys. Therefore, even though the stud 64 is released or moved away from the arm 70, the spring 71 can not rock the zero stop 55 into the path of the debit bank differential because of the fact that a key 20 in this bank has been depressed.

During the operation just described, the zero stop 55 will be in the position shown in Fig. 2 and the zero stop 65 during the operation will have been in a clockwise moved position as viewed in Figs. 5 and 6 and it is therefore necessary to restore this zero stop 65 to the position shown in Fig. 6 which is it normal position. This is accomplished in the following manner. Near the end of the operation of the machine as is fully illustrated and described in the above mentioned Shipley and Goodbar patents, the shaft 75 is given a counterclockwise movement from its released position to a position slightly beyond its normal position which through the link 77 and arms 78 and 81 moves the pin 82 upwardly from the position 95 to the dot and dash position indicated at 97. This movement of the pin 82 rocks the arm 86 and arm 89 counterclockwise whereupon the bottom camming edge 98 of the finger 90 contacts the top of the stud 91 and rocks the arm 73, the shaft 66 to which it is secured and the zero stop 65 back to the position in which they are shown in Fig. 6, after which the shaft 75 is moved slightly clockwise to its normal position which moves the pin 82 back from its position indicated at 97 to the full line normal position in which it is shown and the finger 90 remains in contact with the rear side of the stud 91, thus holding the zero stop 65 in its normal position and consequently causing the stud 64 on the zero stop 65 by its contact with the arm 70, to hold said arm, the shaft 56 to which it is secured and the zero stop 55 in normal position.

Differential mechanism

There is a differential mechanism associated with the bank of debit keys 20 which includes a differentially adjustable arm 100 (Figs. 1 and 2) pivoted on the hub 83. Pivoted at 101 on the differential arm 100 is a latch 102 to which is pivoted at 103 an arm 104 having a toe 105 adapted to cooperate with any one of a series of notches 106, in a plate 107, secured to the key frame 21. Pivoted at 108 on the differential arm 100 is a bell crank 109 in alignment with the debit keys 20.

The latch 102 is held, by a spring 110, in engagement with a driver 111 above a driving shoulder 112 thereof. This driver 111 is given a constant movement clockwise and then counter clockwise to normal position. Upon clockwise movement thereof the shoulder 112 through the latch 102 drives the differential arm 100 clockwise until the forward end of the bell crank 109 comes in contact with a depressed key 20 whereupon the continued movement of the driver 111 causes the bell crank 109 to rock counter clockwise which through the arm 104 disengages the latch 102 from the shoulder 112 and the nose 105 of the arm 104 enters the corresponding notch 106. The latch, at this time, as the driver 111 continues the clockwise movement, is held in contact with a surface 113 of the driver, thus locking the differential arm 100 in the position into which it has been set under control of the depressed key 20.

The driver is given its constant movement clockwise and then counterclockwise by the following mechanism. Pivoted to the driver 111 is a link 114 connected to a lever 115 pivoted on a stud 116 carried by the plate 84. This lever carries rollers 117 and 118 cooperating with plate cams 119 and 120 respectively which are secured to a main drive shaft 121 of the machine. This drive shaft 121 is given one complete clockwise rotation during each machine operation by mechanism which is fully illustrated and described in the above mentioned Shipley Patent No. 1,619,796, whereupon the cams 119 and 120 through the lever 115 and link 114 rock the driver 111 first clockwise a definite extent and then counterclockwise to normal position. As the driver returns to its normal position, a surface 130 thereon contacts a stud 131 carried by the differential arm 100 and restores said differential arm 100 from the position in which it was set to its normal position shown in Fig. 2.

This differential positioning of the arm 100 is transmitted through the usual beam 132 pivoted at 133 thereon to a link 134 by means of a stud 135 on said link which is engaged by a slot in the end of the beam 132. The lower end of the link 134 is pivoted to an arm 136 which sets or positions the mechanism to control the differential feeding of the customer's bill 68, shown in Fig. 7, to select the line to be printed upon corresponding to the key 20 which has been depressed. Such feeding and controlling mechanism is not shown in this application but is fully illustrated and described in the above mentioned Goodbar Patent No. 2,305,000.

This beam mechanism functions in the following manner to differentially position the link 134 and arm 136. As the differential arm 100 moves upwardly, the left end of the beam 132 is rocked clockwise around the center of the hub 83 and is in contact with a collar 137 surrounding the hub 83. As the lever 115 is rocked clockwise by the cams 119 and 120, a roller 138 on the lever 115 contacts a surface 139 of the beam and holds the upper side of the beam in contact with the collar 137 so that the link 134 and arm 136 are positioned in accordance with the differential positioning of the arm 100. Now as the arm 100 is restored to its normal position, the left end of the beam 132 moves downwardly around the stud 135 as the pivot so that the link 134 and arm 136 do not move but remain in the positions in which they have been set. Now during the succeeding operation of the machine when, for example, a different key 20 is depressed after the arm 100 has been set under control of that key, the roller 138 contacts the surface 139 of the beam and moves the link 134 and arm 136 until the upper side of the beam contacts the collar 137, thus positioning the link 134 and arm 136 in accordance with the newly set position of the differential arm 100.

From the above description it is clear that the customer's bill 68, shown in Fig. 7, is fed to a printing position in accordance with the debit key 20 which has been depressed.

As previously stated, if a customer is to receive a credit, for example, for "local service," it is desirable that this credit be printed on the same line as a debit would have been printed had there been a charge for "local service" instead of a credit. Therefore, it is necessary to control the debit differential mechanism which controls the feeding of the bill, by the credit keys 30 and this is accomplished by causing the credit key 30 corresponding to "local service" to operate the key stem 40 associated therewith so that it in turn will control the debit differential mechanism. It will be recalled that the key 30 has a stud 36 immediately above the stud 46 on the key stem 40 so that when the credit key 30 is depressed, the associated key stem 40 will be likewise depressed.

These key stems 40 are, when depressed, in the path of an arm 141 (Figs. 1 and 4) which is secured to a hub 142 to which is secured an arm 143, having a slot engaging a stud 144 of the bell crank 109 of the debit differential mechanism. In order to make the parts more rigid, the arms 141 and 143 are connected by a stud 145.

Therefore, when for example, the "local service" key 30 is depressed the corresponding key stem 40 is depressed and moved into the path of the arm 141 and as the differential arm 100 is moved upwardly the pin 144 of the bell crank 109 causes a clockwise rotation of the arm 143, hub 142 and arm 141 until the end of the arm 141 contacts the end of the depressed key stem 40 which causes this arm to stop and consequently causes the arm 143 to stop which rocks the bell crank 109 counterclockwise and disengages the latch 102 from the driver 111. Therefore, this differential positioning of the arms 141 and 143 causes the arm 100 to be set in the "local service" position, this time under control of the credit key 30, whereupon the beam 132 positions the link 134 and arm 136 to cause the customer's bill 68, shown in Fig. 7, to be fed so that the printing for this "local service" credit will be made on the same line that a "local service" debit would have been made.

When the driver 111 restores the differential arm 100 to its normal position as previously described, the connection between the bell crank 109 and arm 143 restores the arm 143 and consequently the arm 141 to their normal positions.

During the operation in which the key 30 has been depressed the zero stop 65 was held in its ineffective position as previously described which through the pin 64, arm 70 and shaft 56 held the zero stop 55 in its ineffective position to allow the debit differential mechanism to be differentially positioned under control of the credit key 30.

There is a differential mechanism also associated with the credit keys which is used for setting up type carriers to show that the amount printed was a credit amount. This differential mechanism includes a differential arm 150 (Fig. 1) carrying a bell crank 151 which is connected through a pin 152 to an arm 153. The arm 150, the bell crank 151 and arm 153 are substantially identical with the differential arm 100, bell crank 109 and arm 143 previously described. This differential arm 150 also carries a latch mechanism, not shown, but like the latch 102 which is driven by a driver like the driver 111.

*Operation*

Due to the fact that the operations of all the mechanisms and the functions of those operations have been described during the detailed description of this invention it is thought sufficient to state that from the above description it is very clear that the machine embodying the present invention includes a plurality of banks of control keys having a differential mechanism associated with one of those banks of keys which is differentially positioned under control thereof to, in turn, control the differential feeding or positioning of a customer's bill or statement which differential mechanism is also, through novel mechanism, interposed between the plurality of banks of keys, and adapted to be differentially controlled by another bank of keys to cause the bill to be positioned into the same position by keys of like characteristics or like designations when these keys of this second bank are operated instead of the keys of the first bank.

While the form of mechanism herein shown and described is admirably adapted to fulfill the objects primarily stated, it is to be understood that it is not intended to confine the invention to the one form or embodiment herein shown, for it is susceptible of embodiment in various forms, all coming within the scope of the claims which follow.

What is claimed is:

1. In a machine of the class described, the combination of a differential mechanism; a bank of debit keys to control the positioning of said mechanism to different extents and representing certain characteristics; a bank of credit keys representing like characteristics; a set of devices including a plurality of members, one for each of said credit keys and operable by its associated key; and means cooperable with all of the members of said set of devices to control the positioning of said differential mechanism to the same extents when the credit keys are operated that said mechanism is controlled when the debit keys are operated, upon operation of credit keys representing characteristics like the characteristics of the operated debit keys.

2. In a machine of the class described, the combination of differentially adjustable mechanism; a set of keys adapted to control the differential positioning of said mechanism; said keys representing certain characteristics or types of transactions; a second set of keys representing the same characteristics or types of transactions, each characteristic or type of transaction key of the second set being arranged directly opposite the same characteristic or type of transaction key of the first set of keys; a device associated with and operable by each of the keys of the second mentioned set; and means connected to said differential mechanism and associated with said devices and adapted to be differentially controlled by said devices upon operation of the keys of the second set to control the differential positioning of the differential mechanism under control of the second set of keys to the same extents that the first set of keys controls the differential mechanism when keys of like characteristics or types of transactions are operated.

3. In a machine of the class described, the combination of differentially adjustable mechanism; a set of keys adapted to control the differential positioning of said mechanism, said keys representing certain characteristics or types of transactions; a second set of keys representing characteristics or types of transactions, each characteristic or type of transaction key of the second set being arranged directly opposite the same characteristic or type of transaction key of the first set of keys; a device associated with each of the keys of the second mentioned set, each of said devices having an element thereon in the path of a means on each of the keys of the second set to cause the associated device to be operated to control the differential mechanism when a key of the second set is operated; and means connected to said differential mechanism and associated with said devices and adapted to be differentially controlled by said devices upon operation of the keys of the second set to control the differential positioning of the differential mechanism under control of the second set of keys to the same extents that the first set of keys controls the differential mechanism when keys of like characteristics or types of transactions are operated.

4. In a machine of the class described, the combination of differentially adjustable mechanism; a set of keys adapted to control the differential positioning of said mechanism, said keys representing certain characteristics or types of transactions; a second set of keys representing characteristics or types of transactions, each characteristic or type of transaction key of the second set being arranged directly opposite the same characteristic or type of transaction key of the first set of keys; a device associated with each of the keys of the second mentioned set; and means connected to the differential mechanism, said means including a member in the same plane as all of said devices, which member is adapted to be differentially positioned under control of an operated one of said devices upon operation of its associated key of the second set of keys to control said differential mechanism to the same extent that it is controlled by a key of the first set representing a like characteristic or type of transaction.

5. In a machine of the class described, the combination of a differential mechanism; a set of keys, each key representing a certain type of transaction; zero stop means adapted to be controlled by said set of keys; a second set of keys representing types of transactions like the first set of keys; zero stop means associated with and adapted to be controlled as to its effectiveness by the second set of keys; means interposed between the zero stop means to cause the first mentioned zero stop means to be held in an ineffective position when the second mentioned zero stop means is held in an ineffective position by any of the keys of the second mentioned set; and means interposed between the keys of the second mentioned set and the differential mechanism to cause the differential mechanism to be controlled by the second set of keys when the zero stop means are held in their ineffective positions.

6. In a machine of the class described according to claim 5, characterized by the fact that the means interposed between the zero stop means includes an extension on the second mentioned zero stop means and a member rigidly connected to the first mentioned zero stop means for effecting a control of the first mentioned zero stop means by the second mentioned zero stop means.

7. In a machine of the class described, the combination of a differentially adjustable mechanism; a plurality of manipulative devices to control the differential positioning thereof; a second plurality of manipulative devices; a plurality of members arranged adjacent to and associated with and operable by the second plurality of devices, one of said members being alongside of and parallel with each one of said second devices; and means interposed between said differential mechanism and said members and adapted to be controlled by said members when operated by said second plurality of devices to cause said members to control the differential positioning of said mechanism to the same extents as said mechanism is controlled by the corresponding ones of said first mentioned plurality of devices.

8. In a machine of the class described, the combination of a differentially adjustable mechanism; a plurality of manipulative devices to control the differential positioning thereof; a second plurality of manipulative devices; a plurality of members associated with and operable by the second plurality of devices; a projection on each of said members; means on each of said second plurality of manipulative devices to cooperate with the projection on the associated member to operate said member; and means interposed between said differential mechanism and said members and adapted to be controlled by said members when operated by said second plurality of devices to cause said members to control the differential positioning of said mechanism to the same extents as said mechanism is controlled by said first mentioned plurality of devices.

9. In a machine of the class described, the combination of a differentially adjustable mechanism; a plurality of manipulative devices to control the differential positioning thereof; a second plurality of manipulative devices; a plurality of members associated with and operable by the second plurality of devices; and means interposed between said differential mechanism and said members, said interposed means including an arm adapted to be differentially positioned under control of the second plurality of manipulative devices; and means connecting said arm to said differential mechanism to transmit the differential positioning of said arm to said differential mechanism to control the differential positioning of said mechanism to the same extents as said mechanism is controlled by said first mentioned plurality of devices.

10. In a machine of the class described, having a machine release mechanism, the combination of a differential mechanism; zero stop means associated with said differential mechanism; a set of manipulative devices to control said differential mechanism and said zero stop means; a second set of manipulative devices; zero stop means associated with the second set of manipulative devices; means to retain the second mentioned zero stop means normally in an inactive position; means connected to the second mentioned zero stop means to retain the first mentioned zero stop means in an inactive position when said second mentioned zero stop means is so retained; and means operable when the machine release mechanism is operated to release the first mentioned zero stop means to the control of the first set of manipulative devices, and to release the second mentioned zero stop means to the control of the second set of manipulative devices whereby said first mentioned zero stop means is also released to the control of said second set of manipulative devices.

11. In a machine of the class described, having a machine release mechanism, the combination of a differential mechanism; zero stop means associated with said differential mechanism; a set of manipulative devices to control said differential mechanism and said zero stop means; a second set of manipulative devices; zero stop means associated with the second set of manipulative devices; means to retain the second mentioned zero stop means normally in an inactive position; means intermediate the zero stop means to cause the second zero stop means to retain the first zero stop means in an inactive position while the second zero stop means is so retained; and means operable upon release of the machine for operation to actuate said retaining means to release the second zero stop means to the control of the second set of manipulative devices the operation of any of which directly prevents release of the second mentioned zero stop means upon actuation of said retaining means, and through said intermediate means prevents release of the first mentioned zero stop means.

12. In a machine of the class described according to claim 11 wherein said intermediate means includes a member secured by means of a rockable shaft to the first mentioned zero stop means and also includes a projection on said second mentioned zero stop means cooperating with said member.

RUDOLPH J. MOSER.

REFERENCES CITED

The following references are of record in the file of this patent:

UNITED STATES PATENTS

| Number | Name | Date |
|---|---|---|
| 2,178,339 | Gates | Oct. 31, 1939 |
| 2,305,000 | Goodbar | Dec. 15, 1942 |
| 2,345,839 | Spurlino et al. | Apr. 4, 1944 |